US012114699B2

(12) United States Patent
Liu

(10) Patent No.: US 12,114,699 B2
(45) **Date of Patent: *Oct. 15, 2024**

(54) GLASS ATOMIZER

(71) Applicant: Shenzhen Eigate Technology Co., Ltd., Shenzhen (CN)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 747 days.

This patent is subject to a terminal disclaimer.

(21) Appl. No.: 17/233,525

(22) Filed: Apr. 18, 2021

(65) Prior Publication Data

US 2022/0132928 A1 May 5, 2022

(30) Foreign Application Priority Data

Nov. 1, 2020 (CN) ......................... 202011199301.3
Nov. 1, 2020 (CN) ......................... 202022476807.6

(51) Int. Cl.

| | |
|---|---|
| ***A24F 40/46*** | (2020.01) |
| ***A24F 1/32*** | (2006.01) |
| ***A24F 7/00*** | (2006.01) |
| ***A24F 40/10*** | (2020.01) |
| ***A24F 40/42*** | (2020.01) |
| ***A24F 40/48*** | (2020.01) |
| ***H05B 3/16*** | (2006.01) |

(52) U.S. Cl.

CPC ................ *A24F 40/46* (2020.01); *A24F 1/32* (2013.01); *A24F 7/00* (2013.01); *A24F 40/10* (2020.01); *A24F 40/42* (2020.01); *A24F 40/48* (2020.01); *H05B 3/16* (2013.01)

(58) Field of Classification Search

None

See application file for complete search history.

(56) References Cited

U.S. PATENT DOCUMENTS

| | | | | |
|---|---|---|---|---|
| 3,882,875 | A * | 5/1975 | Frost | A24F 1/30 131/229 |
| 2017/0311384 | A1* | 10/2017 | Wu | A61M 11/042 |
| 2018/0221605 | A1* | 8/2018 | Marks | A24F 40/46 |
| 2018/0228219 | A1* | 8/2018 | Qiu | A24F 40/48 |
| 2019/0134320 | A1* | 5/2019 | Fornarelli | A24F 40/485 |

* cited by examiner

*Primary Examiner* — Philip Y Louie
*Assistant Examiner* — Jeffrey A. Buckman
(74) *Attorney, Agent, or Firm* — MATTHIAS SCHOLL P.C.; Matthias Scholl

(57) ABSTRACT

A glass atomizer includes a member for e-liquid injection and vapor discharge. The member for e-liquid injection and vapor discharge includes an outer glass tube and an inner glass tube disposed in the outer glass tube. The inner glass tube includes a top end. The top end includes a disk edge; the top end is integrated with the inner wall of the outer glass tube. The disk edge includes an e-liquid injection hole. The e-liquid injection hole communicates with a space between the outer glass tube and the inner glass tube.

8 Claims, 5 Drawing Sheets

GLASS ATOMIZER

CROSS-REFERENCE TO RELATED APPLICATIONS

Pursuant to 35 U.S.C. § 119 and the Paris Convention Treaty, this application claims foreign priority to Chinese Patent Application No. 202011199301.3 filed on Nov. 1, 2020, and to Chinese Patent Application No. 202022476807.6 filed on Nov. 1, 2020. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a glass atomizer.

Conventionally, the atomizers include a cylindrical ceramic core and a spiral heating wire disposed in the cylindrical ceramic core. The spiral heating wire has a low heating power, and thus only a small amount of vapor is produced.

SUMMARY

The disclosure provides a glass atomizer, comprising a member for e-liquid injection and vapor discharge; the member for e-liquid injection and vapor discharge comprises an outer glass tube and an inner glass tube disposed in the outer glass tube; the inner glass tube comprises a top end; the top end comprises a disk edge; the top end is integrated with an inner wall of the outer glass tube; the disk edge comprises an e-liquid injection hole; and the e-liquid injection hole communicates with a space between the outer glass tube and the inner glass tube.

In a class of this embodiment, the member for e-liquid injection and vapor discharge further comprises a seal gasket and a ceramic heating core; the seal gasket and the ceramic heating core each comprises a hollow center, and the seal gasket is disposed in the hollow center of the ceramic heating core; one end of the ceramic heating core is embedded in a bottom opening of the inner glass tube; a bottom end of the inner glass tube abuts against the seal gasket or the seal gasket is disposed around the bottom end of the inner glass tube.

In a class of this embodiment, the ceramic heating core is in the shape of a hollow convex disc, and comprises a bottom and a heating wire disposed on the bottom.

In a class of this embodiment, the member for e-liquid injection and vapor discharge further comprises a fixed ring and a base; the fixed ring is disposed around the base; and a bottom end of the outer glass tube is disposed around the fixed ring.

In a class of this embodiment, the base comprises an air hole.

In a class of this embodiment, the member for e-liquid injection and vapor discharge further comprises a silicone fixing part; the ceramic heating core is disposed on the silicone fixing part; and the silicone fixing part is disposed in the base.

In a class of this embodiment, the silicone fixing part comprises a central air tube.

In a class of this embodiment, the member for e-liquid injection and vapor discharge further comprises a seal plug; the seal plug comprises a bottom end comprising a sealing protrusion; the seal plug is disposed on a top of the inner glass tube and the sealing protrusion is configured to seal the e-liquid injection hole of the inner glass tube after the space between the inner glass tube and the outer glass tube is filled with e-liquid.

In a class of this embodiment, the member for e-liquid injection and vapor discharge further comprises a joint and an insulation ring; the insulation ring is disposed in a bottom of the base to separate a positive lead from a negative lead of the ceramic heating core and meanwhile fix the negative lead; and the joint is disposed in the insulation ring to fix the positive lead of the ceramic heating core.

In a class of this embodiment, the member for e-liquid injection and vapor discharge further comprises a mouthpiece and a seal ring; the seal ring is disposed around the mouthpiece to seal a gap between the mouthpiece and the outer glass tube thus preventing the leakage of air and vapor; and the mouthpiece is disposed on a top of the outer glass tube and is disposed around the seal plug.

In a class of this embodiment, the air enters the atomizer via a space between the fixed ring and the base, flows through the air hole on the base and the central air tube on the silicone fixing part, drives the vapor produced by the ceramic heating core to flow into the inner glass tube, through the inner space of the seal plug, and is discharged from the top opening of the mouthpiece for user's inhaling.

In a class of this embodiment, the outer glass tube and the inner glass tube comprise toughened glass, high temperature resistant poly-cyclohexylenedimethylene terephthalate glycol (PCTG), high temperature resistant resin, high temperature resistant acrylic, an explosion-proof film, or a combination thereof.

DETAILED DESCRIPTION

To further illustrate, embodiments detailing a glass atomizer are described below. It should be noted that the following embodiments are intended to describe and not to limit the disclosure.

Figure 1:
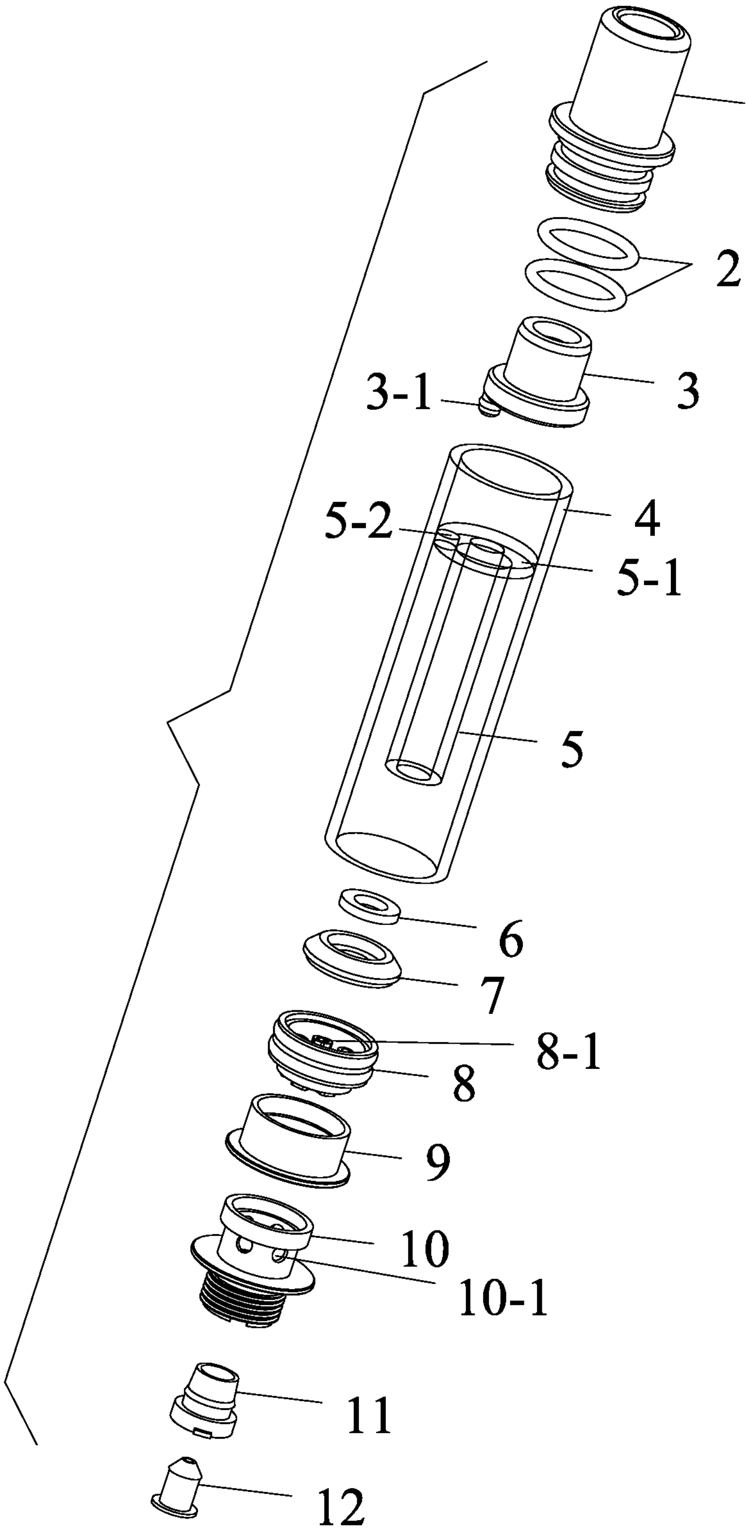
FIG. 1 is an exploded view of a glass atomizer in accordance with one embodiment of the disclosure.
Figure 2:
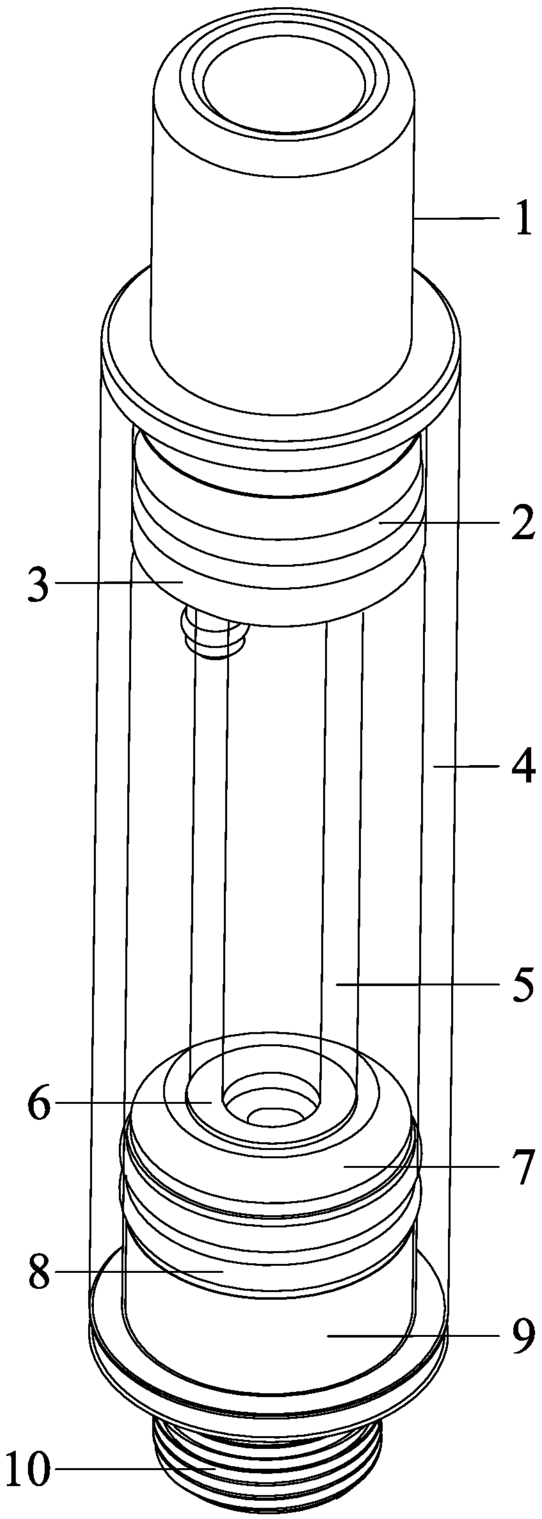
FIG. 2 is a schematic diagram of a glass atomizer in accordance with one embodiment of the disclosure.
Figure 3:
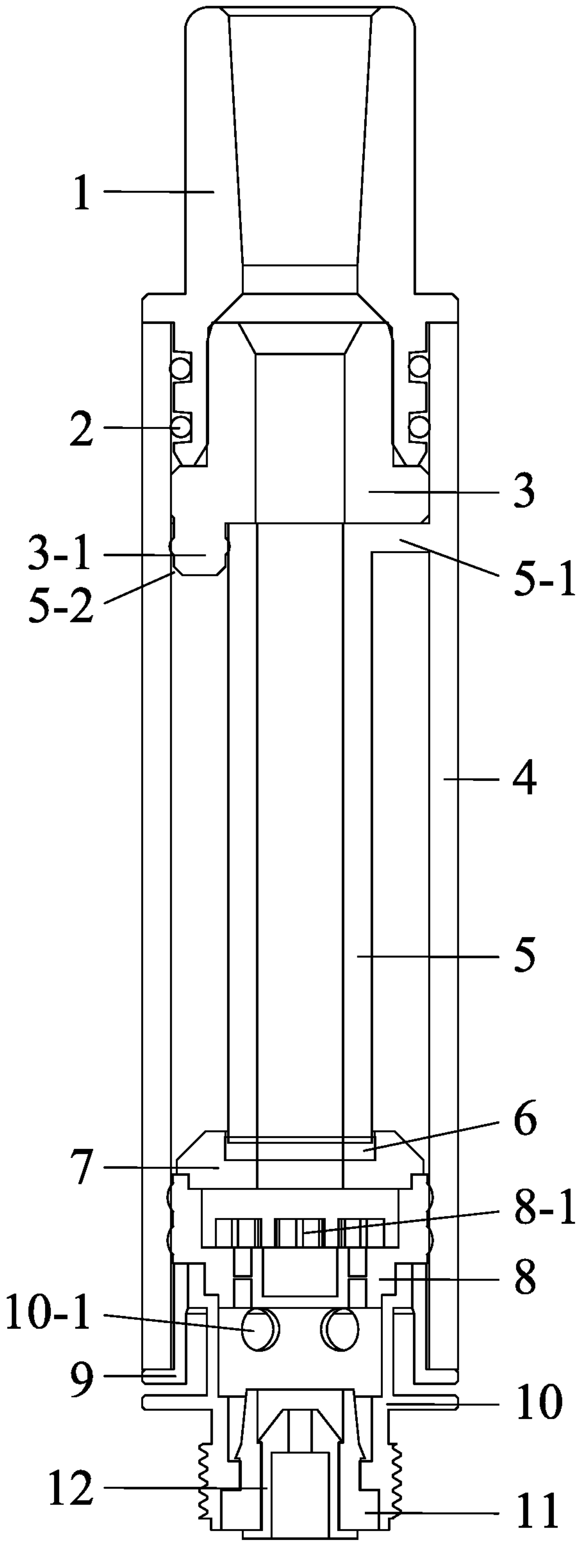
FIG. 3 is a sectional view of a glass atomizer in accordance with one embodiment of the disclosure.
Figure 4:
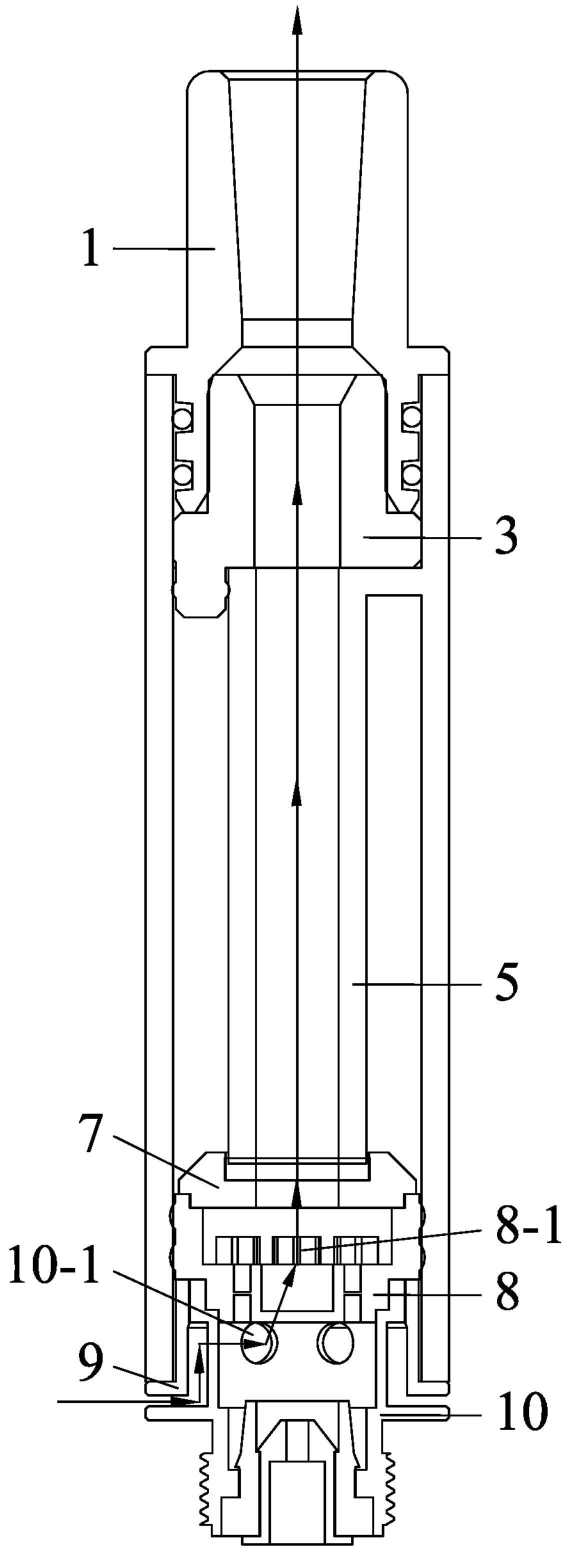
FIG. 4 shows a moving direction of air in a glass atomizer in accordance with one embodiment of the disclosure.
Figure 5:
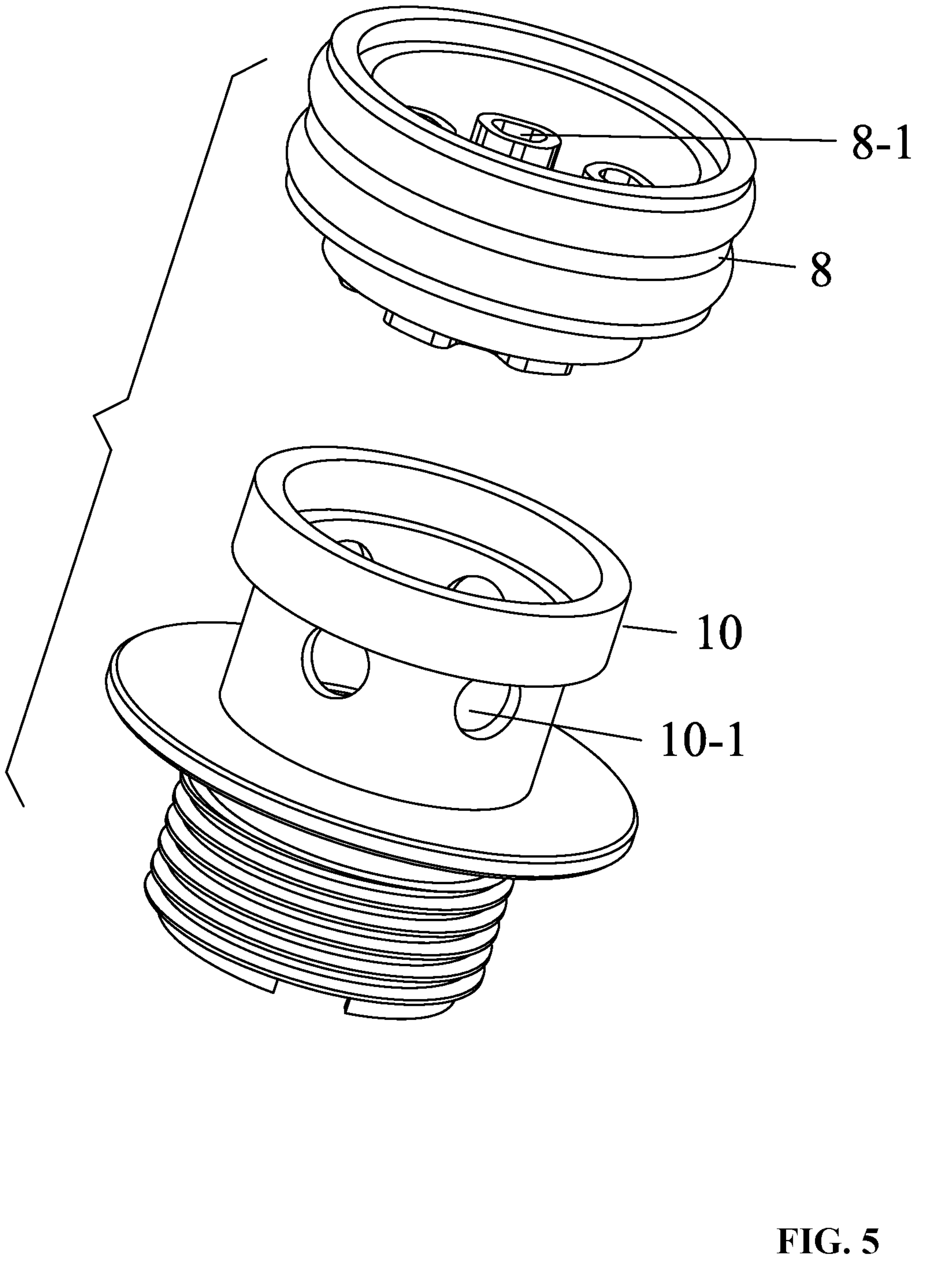
FIG. 5 is an exploded view of an air passage of a glass atomizer in accordance with one embodiment of the disclosure.

As shown in FIGS. 1-5, the disclosure provides a glass atomizer comprising a mouthpiece 1, a seal ring 2, a seal plug 3, an outer glass tube 4, an inner glass tube 5, a seal gasket 6, a ceramic heating core 7, a silicone fixing part 8, a fixed ring 9, a base 10, an insulation ring 11, and a joint 12. The inner glass tube 5 is disposed in the outer glass tube 4. The inner glass tube 5 comprises a top end. The top end comprises a disk edge 5-1. The top end is integrated with the inner wall of the outer glass tube 4. The disk edge 5-1 comprises an e-liquid injection hole 5-2. The e-liquid injection hole 5-2 communicates with the space between the outer glass tube 4 and the inner glass tube 5 for e-liquid addition. The seal gasket 6 and the ceramic heating core 7 each comprise a hollow center. The seal gasket 6 is dispose in the hollow center of the ceramic heating core 7 to seal the bottom opening of the inner glass tube 5 thus preventing e-liquid from flowing into the inner glass tube 5. One end of the ceramic heating core 7 is embedded in the bottom opening of the inner glass tube 5. The bottom end of the inner glass tube 5 abuts against the seal gasket 6 or the seal gasket 6 is disposed around the bottom end of the inner glass tube 5. The fixed ring 9 is disposed around the base 10 to cover the air hole 10-1 on the base 10 and fix the outer glass tube 4. The bottom end of the outer glass tube 4 is disposed around the fixed ring 9. The ceramic heating core 7 is disposed on the silicone fixing part 8. The silicone fixing part 8 is disposed in the base 10 to seal the bottom opening of the outer glass tube 4. The insulation ring 11 is disposed in the bottom of the base 10 to separate the positive lead from the negative lead of the ceramic heating core 7 and meanwhile fix the negative lead. The joint 12 is disposed in the insulation ring 11 to fix the positive lead of the ceramic heating core 7. The seal plug 3 comprises a bottom end comprising a sealing protrusion 3-1. The seal plug 3 is disposed on the top of the inner glass tube 5 and the sealing protrusion 3-1 is configured to seal the e-liquid injection hole 5-2 of the inner glass tube 5 after the space between the inner glass tube 5 and the outer glass tube 4 is filled with e-liquid. The seal plug 3 is connected to the mouthpiece 1. The seal ring 2 is disposed around the mouthpiece 1 to seal the gap between the mouthpiece 1 and the outer glass tube 4 thus preventing the leakage of the air and the vapor. The mouthpiece 1 is disposed on the top of the outer glass tube 4 and is in threaded connection to the seal plug 3.

When injected into the space between the inner glass tube 5 and the outer glass tube 4, the e-liquid penetrates into the surface of the ceramic heating core 7, and no drops are formed on the surface of the ceramic heating core 7 and no drops leak into the space between the inner glass tube 5 and the outer glass tube 4. The air enters the atomizer via the space between the fixed ring 9 and the base 10, flows through the air hole 10-1 on the base 10 and the central air tube 8-1 on the silicone fixing part 8, drives the vapor produced by the ceramic heating core 7 to flow into the inner glass tube 5, through the inner space of the seal plug 3, and is discharged from the top opening of the mouthpiece 1 for user's inhaling.

In the disclosure, the air hole 10-1 and the central air tube 8-1 are configured for air ventilation and can present in different forms. For example, the air hole 10-1 is disposed on the outer edge of the base 10, or the central air tube 8-1 is replaced by through holes, etc. The disk edge 5-1 of the inner glass tube 5 are not necessarily on the top end of the inner glass tube 5, but may be on the middle part of the inner glass tube. The top of the inner glass tube 5 and the top of the outer glass tube 4 may be flush, and the mouthpiece 1 is disposed on the top of the outer glass tube 4. The material of the outer glass tube 4 and the inner glass tube 5 can also be replaced by the same material selected from toughened glass, high temperature resistant poly-cyclohexylenedimethylene terephthalate glycol (PCTG), high temperature resistant resin, high temperature resistant acrylic, an explosion-proof film, or a combination thereof.

The following advantages are associated with the glass atomizer of the disclosure:

1. The glass atomizer comprises an outer glass tube and an inner glass tube disposed in the outer glass tube, and the air and the vapor flow in the inner glass tube. The e-liquid is stored in the space between the inner glass tube and the outer glass tube. This simplifies the storage of the e-liquid and the discharge of vapor of the atomizer.
2. The ceramic heating core 7 is in the shape of a hollow convex disc, and comprises a protruding edge, a bottom, and a heating wire disposed on the bottom, which is novel.
3. The e-liquid is directly injected into the atomizer via the top opening of the inner glass tube, which is easy to operate.
4. The air hole on the base of the atomizer is covered by the fixed ring disposed on the base. The air enters the atomizer from the space between the fixed ring and the base, and then flows to the air hole. The design is novel.

It will be obvious to those skilled in the art that changes and modifications may be made, and therefore, the aim in the appended claims is to cover all such changes and modifications.

What is claimed is:

1. An atomizer, comprising a member for e-liquid injection and vapor discharge, wherein:

the member for e-liquid injection and vapor discharge comprises an outer tube, an inner tube disposed in the outer tube, a seal gasket, and a ceramic heating core;

the inner tube comprises a top end; the top end comprises a disk edge; the top end is integrated with an inner wall of the outer glass tube; the disk edge comprises an e-liquid injection hole; and the e-liquid injection hole communicates with a space between the outer tube and the inner tube;

wherein the outer tube and the inner tube comprise glass, toughened glass, high temperature resistant poly-cyclohexylenedimethylene terephthalate glycol (PCTG), high temperature resistant resin, high temperature resistant acrylic, an explosion-proof film, or a combination thereof;

the space between the outer tube and the inner tube is adapted for storing an e-liquid;

the seal gasket and the ceramic heating core each comprises a central through hole, and the seal gasket is disposed in the central through hole of the ceramic heating core;

a bottom opening of the inner tube is disposed in the central through hole of the ceramic heating core; and a bottom end of the inner tube abuts against the seal gasket or the seat gasket is disposed around the bottom end of the inner tube; whereby the inner tube is supported by the ceramic heating core;

the ceramic heating core is in the shape of a disc; and the ceramic heating core comprises a top flat circular surface, a bottom flat circular surface opposite to the top flat circular surface, a conical edge, and a heating wire; wherein:

the conical edge extends from the top flat circular surface in a direction away from the bottom flat circular surface; and the conical edge comprises a conical surface gradually reduced in diameter in the direction away from the bottom flat circular surface; the central through hole of the ceramic heating core extends through the conical edge, the top flat circular surface, and the bottom flat circular surface; and the heating wire is disposed on the bottom flat circular surface;

the conical edge of the ceramic heating core is disposed adjacent to the space between the outer tube and the inner tube; and the surfaces on the conical edge of the ceramic heating core are adapted for conveying the e-liquid from the space between the outer tube and the inner tube to the bottom flat circular surface to be atomized.

2. The atomizer of claim 1, wherein the member for e-liquid injection and vapor discharge further comprises a fixed ring and a base; the fixed ring is disposed around the base; and a bottom end of the outer tube is disposed around the fixed ring.

3. The atomizer of claim 2, wherein the base comprises an air hole.

4. The atomizer of claim 3, wherein the member for e-liquid injection and vapor discharge further comprises a silicone fixing part; the ceramic heating core is disposed on the silicone fixing part; and the silicone fixing part is disposed in the base.

5. The atomizer of claim 4, wherein the silicone fixing part comprises a central air tube.

6. The atomizer of claim 5, wherein the member for e-liquid injection and vapor discharge further comprises a seal plug; the seal plug comprises a bottom end comprising a sealing protrusion; the seal plug is disposed on a top of the inner tube and the sealing protrusion is configured to seal the e-liquid injection hole of the inner tube after the space between the inner tube and the outer tube is filled with e-liquid.

7. The atomizer of claim 6, wherein the member for e-liquid injection and vapor discharge further comprises a joint and an insulation ring; the insulation ring is disposed in a bottom of the base to separate a positive lead from a negative lead of the ceramic heating core and meanwhile fix the negative lead; and the joint is disposed in the insulation ring to fix the positive lead of the ceramic heating core.

8. The atomizer of claim 7, wherein the member for e-liquid injection and vapor discharge further comprises a mouthpiece and a seal ring; the seal ring is disposed around the mouthpiece to seal a gap between the mouthpiece and the outer tube thus preventing the leakage of air and vapor; and the mouthpiece is disposed on a top of the outer tube and is disposed around the seal plug.

* * * * *